United States Patent [19]
Sedore

[11] Patent Number: 5,517,784
[45] Date of Patent: May 21, 1996

[54] MOUSETRAP CONTAINER

[76] Inventor: Michael Sedore, 385 S. Greenhaven Rd., Stormville, N.Y. 12582

[21] Appl. No.: 312,221

[22] Filed: Sep. 26, 1994

[51] Int. Cl.⁶ ..................................................... A01M 1/12
[52] U.S. Cl. ..................................... 43/69; 43/64
[58] Field of Search ..................... 43/69, 71, 72, 43/74, 64

[56] References Cited

U.S. PATENT DOCUMENTS

| | | | |
|---|---|---|---|
| 710,020 | 9/1902 | Short | 43/71 |
| 1,050,220 | 1/1913 | Link | 43/71 |
| 1,420,384 | 6/1922 | Pierini | 43/69 |
| 1,635,224 | 7/1927 | Rowley | 43/69 |
| 1,727,666 | 9/1929 | Nicks | 43/69 |
| 2,579,093 | 12/1951 | Rosener | 43/69 |
| 2,775,844 | 1/1957 | Barnes | 43/69 |
| 3,528,191 | 9/1970 | Hand | 43/64 |
| 4,662,101 | 5/1987 | Fisher | 43/69 |
| 4,876,821 | 10/1989 | Benzie | 43/69 |

FOREIGN PATENT DOCUMENTS

| | | | |
|---|---|---|---|
| 549800 | 12/1957 | Canada | 43/64 |
| 83599 | 10/1895 | Germany | 43/71 |
| 25468 | of 1901 | United Kingdom | 43/71 |
| 22007 | of 1903 | United Kingdom | 43/71 |

OTHER PUBLICATIONS

"American Builder", Jul. 1951, p. 182.

Primary Examiner—Kurt Rowan

[57] ABSTRACT

A mousetrap container having a container floor and container side walls, with a fluid positioned within the container cavity defined within the container, and a rotary cylinder mounted rotatably relative to an entrance opening of the container, such that the container cylinder is arranged to receive and adhere a bait thereto, and a platform mounted to the entrance receives a rodent thereon, such that the rodent upon traversing the platform is directed onto the cylinder and the bait, whereupon rotation of the cylinder directs the rodent into the fluid within the container.

3 Claims, 4 Drawing Sheets

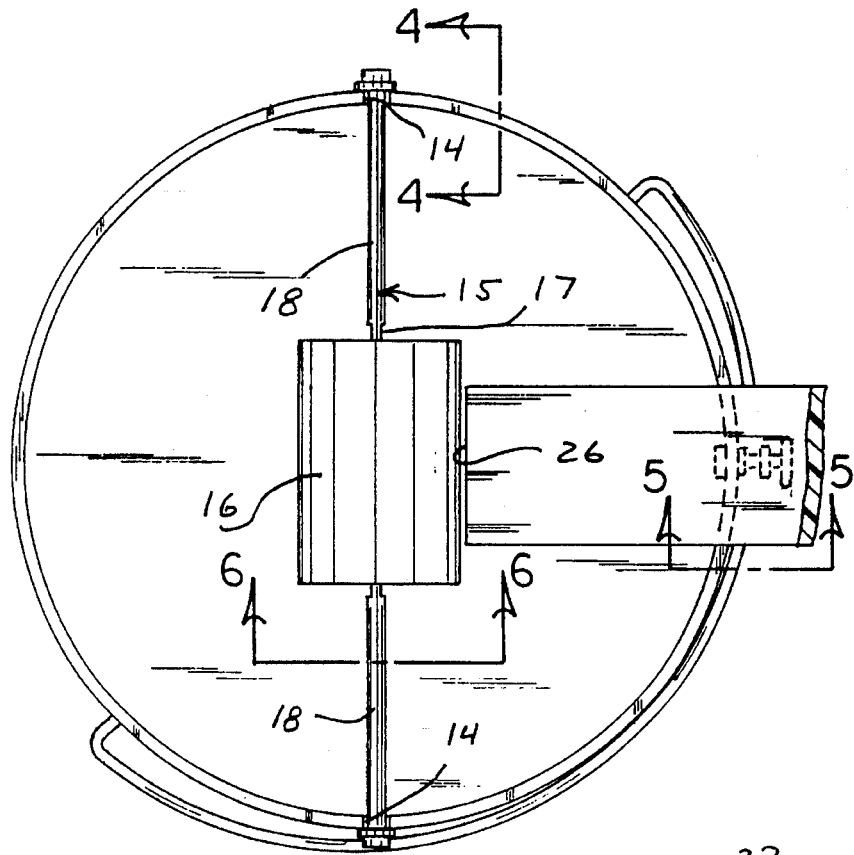
FIG. 3
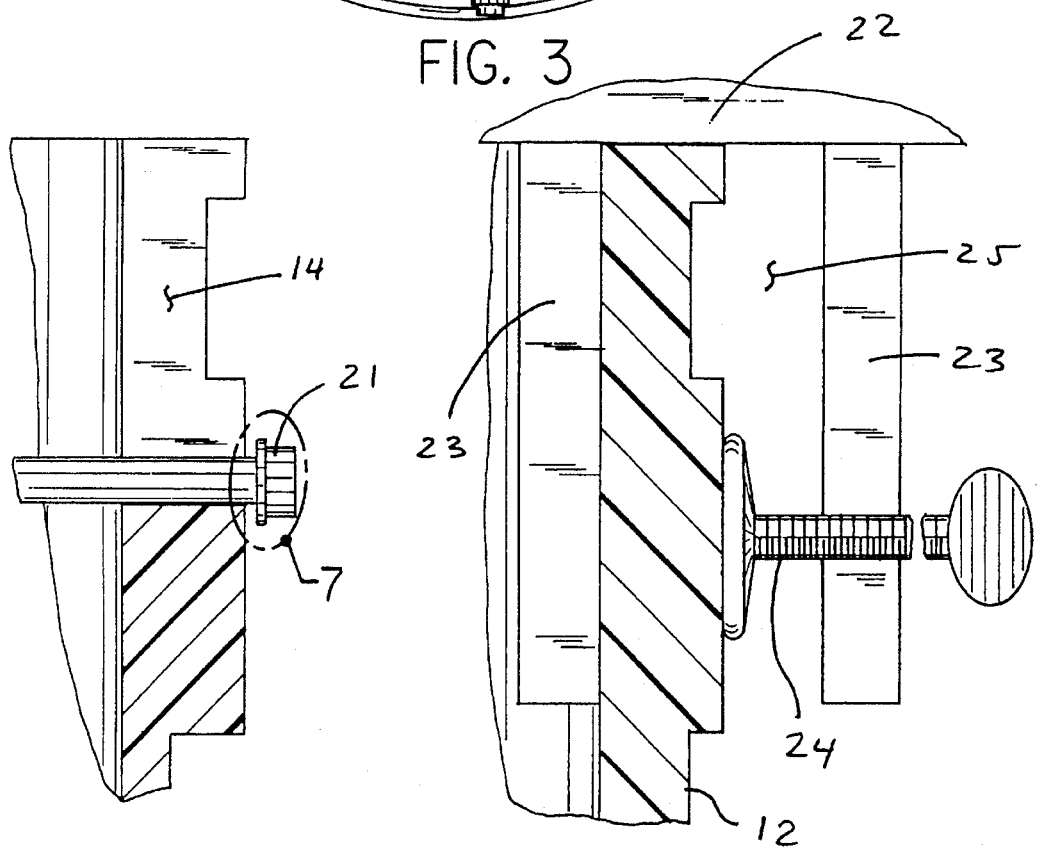
FIG. 4
FIG. 5

5,517,784

MOUSETRAP CONTAINER

TECHNICAL FIELD

The field of invention relates to mousetrap structure, and more particularly pertains to a mousetrap container wherein the same is arranged to attract rodents to an uppermost end of the container and direct their entry into the container.

BACKGROUND OF THE INVENTION

Mousetrap structures of various types are utilized throughout the prior art and arranged from a simple mousetrap construction as indicated in U.S. Pat. No. 5,142,813 to a more complex construction as indicated in U.S. Pat. No. 4,154,016.

The instant invention is directed to a mousetrap structure arranged for ease of use as well as effectiveness in construction and in this respect, the present invention substantially fulfills this need.

SUMMARY OF THE INVENTION

The present invention relates to a mousetrap container wherein a platform accommodates a mouse thereon, with a roller member positioned medially of the container at an entrance end thereof, such that bait positioned upon the roller member attracts a rodent thereon directing his displacement into the container as the cylinder rotates upon the mouse accessing onto an exterior surface of that cylinder.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a top view of the invention.

FIG. 4 is an enlarged orthographic view, taken along the lines 4—4 of FIG. 3 in the direction indicated by the arrows.

FIG. 5 is an enlarged orthographic view, taken along the lines 5—5 of FIG. 3 in the direction indicated by the arrows.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
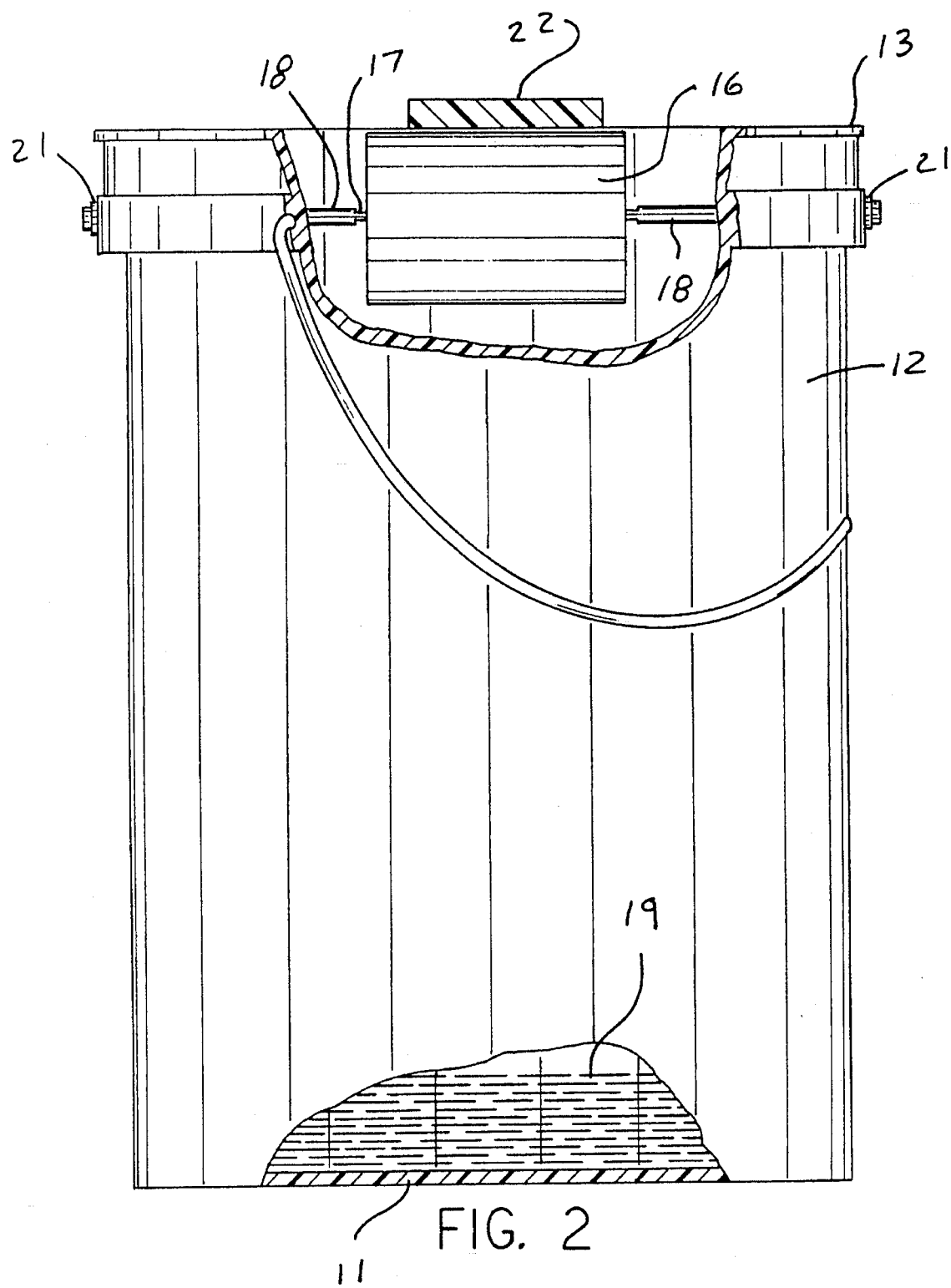
FIG. 2 is an orthographic view of the invention, taken partially in section.
Figure 6:
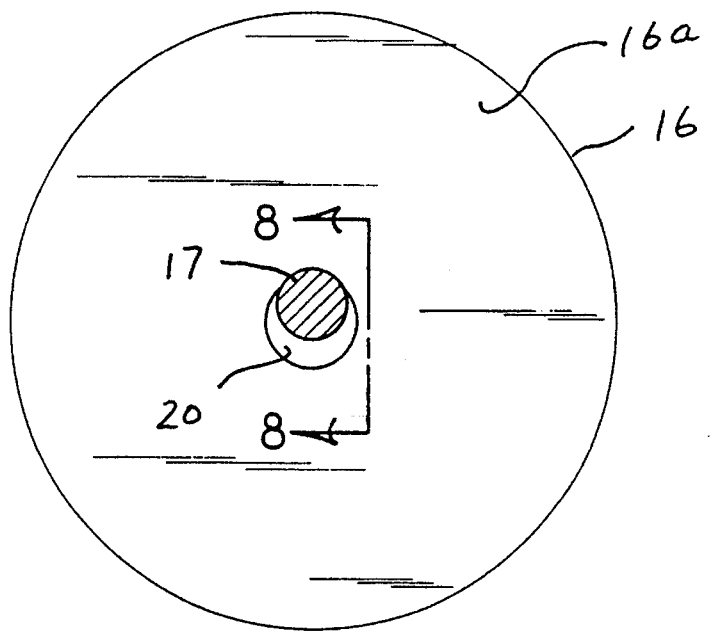
FIG. 6 is an enlarged orthographic view, taken along the lines 6—6 of FIG. 3 in the direction indicated by the arrows.
Figures 7, 8:
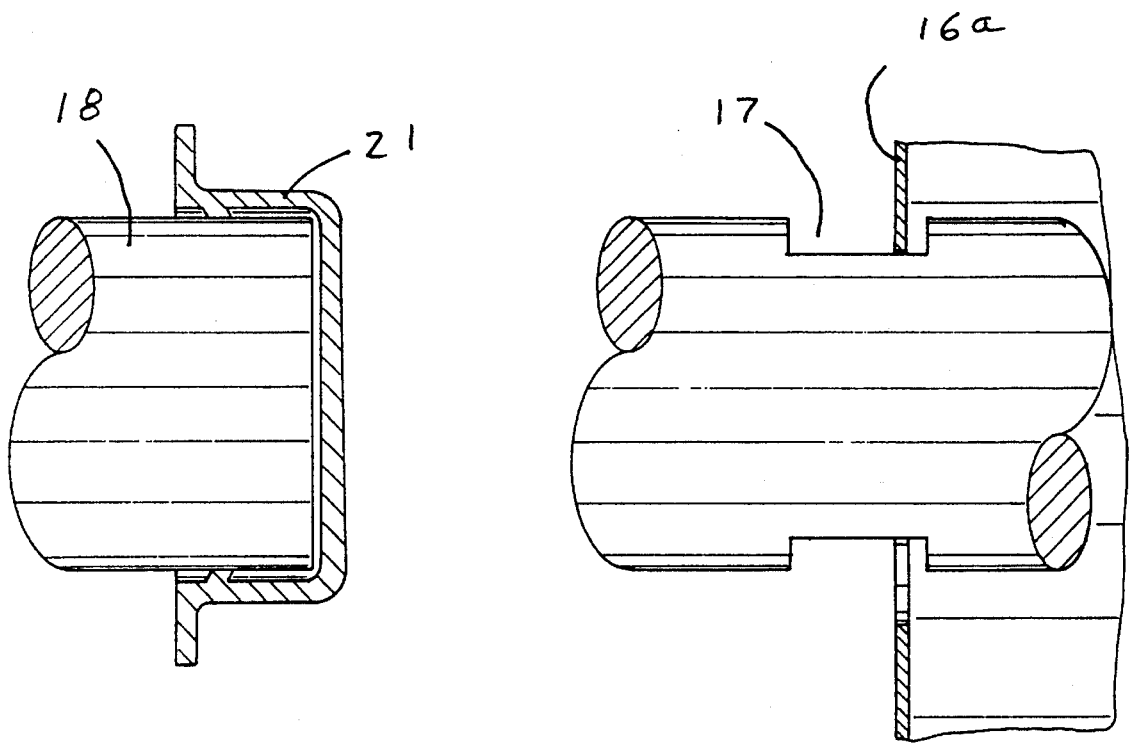
FIG. 7 is an enlarged orthographic view, as indicated in section 7 of FIG. 4.
FIG. 8 is an enlarged orthographic view, taken along the lines 8—8 of FIG. 6 in the direction indicated by the arrows.

The invention presented as a mousetrap container 10 is arranged to include a container floor 11 having a side wall 12, with an entrance rim 13 configured at an uppermost end of the side wall 12 at a distal end relative to the container floor 11, such that the container having a container cavity is arranged to receive a fluid 19 therewithin such as water for the dispatching of a rodent and the like directed into the container cavity. Directed through the entrance rim 13 are a pair of aligned container recesses 14 that are aligned relative to one another in a mirror image relationship, such that an axle 15 is rotatably mounted within the container recesses 14, with the axle 15 captured such that each free distal end of the axle includes an axle fastener 21, with the axle fastener 21 as illustrated in FIG. 2 for example positioned exteriorly of the container side wall 12. The axle 15 is arranged with spaced axle recesses 17 (see FIGS. 2, 3, and 8 for example), with the rotary cylinder having cylinder end walls 16a, with each cylinder end wall 16a received within a respective axle recess 17. To this end, the axle recesses define a thin portion of the axle defining a first diameter less than a second diameter defined by outer portions 18 of that axle 15, wherein the cylinder end walls 16a each include a cylinder bore 20 that are diametrically aligned relative to one another, with the axle bore 20 having a third diameter greater than the first diameter yet less than the second diameter to capture each cylinder wall within a respective recess 17. In this manner, the cylinder 16 is rotatably mounted about the axle 15, for purposes to be described in more detail below.

Figure 1:
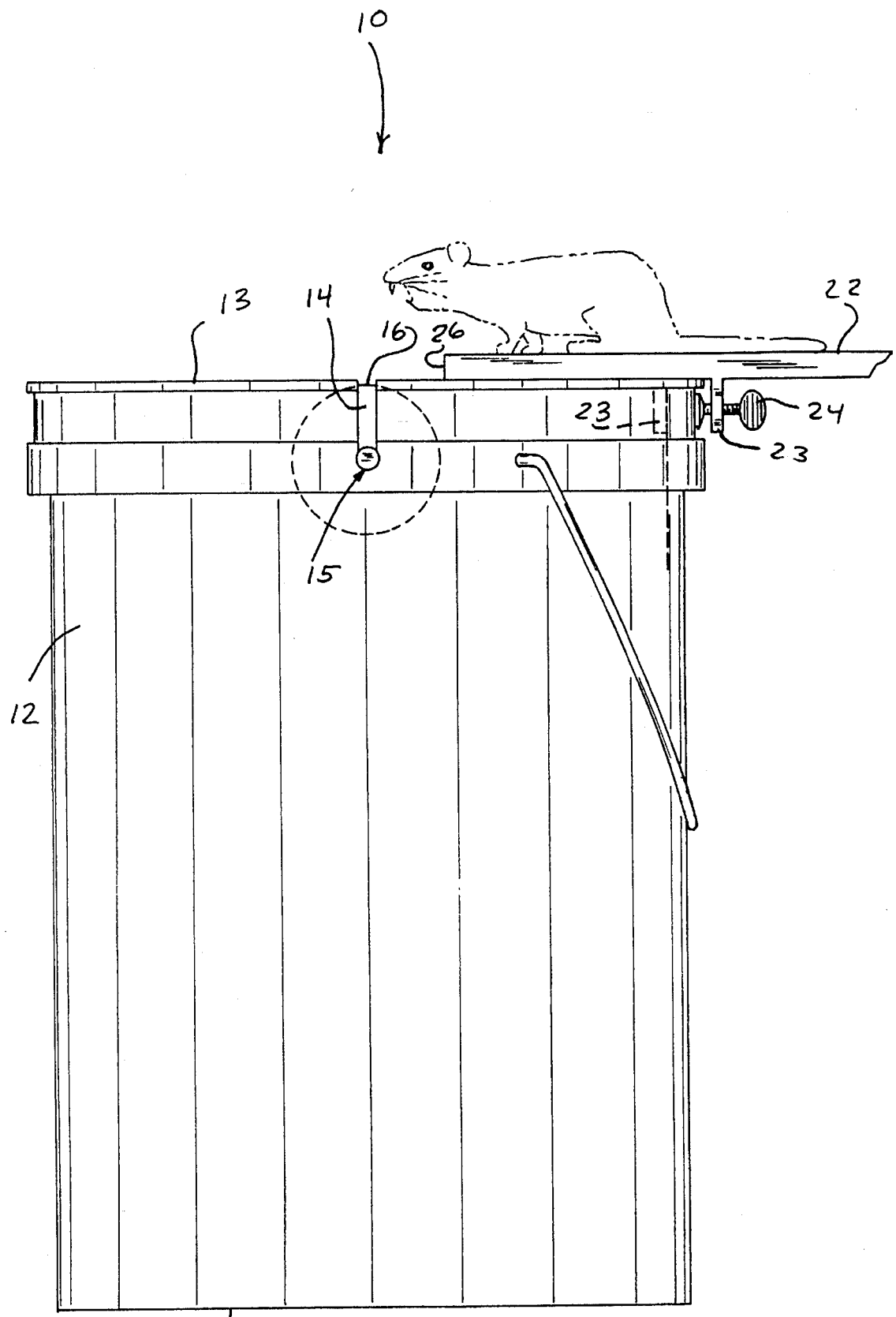
FIG. 1 is an orthographic view of the invention.

A platform 22 includes a pair of platform flanges 23 (see FIGS. 1 and 5 for example), with the platform flanges spaced apart to define a gap therebetween, with a platform fastener 24 directed through one of the flanges 23 into the gap to thereby capture the side wall 12 within the gap between the fastener and a further one of the flanges 23. The flange gap 25 as related to the securement of the side wall 12 is illustrated in FIG. 5. The platform 22 having a platform forward end 26 spaced from the container 11 is arranged to receive the mouse thereon, as illustrated in FIG. 1 for example, with the platform forward end 26 spaced from the rotary cylinder 16 as illustrated in FIG. 1, such that the mouse is attracted to the rotary cylinder 16 by bait positioned thereon, such as peanut butter which adheres to the cylinder 16. The mouse to gain access to the bait must depart the platform, to the cylinder 16, whereupon the cylinder deposits the mouse into the container cavity and into the fluid 19 for the dispatching of the mouse in this manner.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A mousetrap container, comprising,
   a container, the container having a container floor, and a container side wall, the side wall having an entrance rim at a free distal end of the side wall spaced from the floor, the entrance rim including an axle secured to the container adjacent the entrance rim, and the axle having a rotary cylinder rotatably mounted relative to the axle, and a platform, the platform secured to the container side wall adjacent the entrance rim, and the platform extending from the entrance rim to the cylinder;

wherein the cylinder includes spaced cylinder end walls, and each of the end walls having an end wall opening, and the axle having spaced axle recesses, and the axle directed through each end wall opening, and each cylinder end wall captured within a respective one of the axle recesses;

wherein the axle is arranged to include a second diameter, and each of the recesses is arranged in surrounding relationship relative to a thinned axle portion, and the thinned axle portion having a first diameter less than the second diameter, and each end wall opening defining a third diameter less than the second diameter and greater than the first diameter;

wherein the axle includes a plurality of axle distal ends positioned exteriorly of the container, and each axle distal end includes an axle fastener to prevent displacement of the axle relative to the container, and the container side wall having spaced container recesses, and each of the container recesses receives the axle therewithin;

wherein the platform includes a plurality of platform flanges defining a flange gap therebetween, and the container side wall is received within the flange gap, and a platform fastener is directed through one of said flanges, and the container side wall is captured between the platform fastener and a further one of the flanges.

2. A mousetrap container as set forth in claim 1 wherein the platform further includes a platform forward end, and the platform forward end is positioned in a spaced adjacency relative to the cylinder.

3. A mousetrap container comprising:

a container having a container floor and a container side wall, the side wall having an entrance rim at a free distal end of the side wall spaced from the floor;

an axle secured to the container adjacent the entrance rim;

a rotary cylinder rotatably mounted relative to the axle;

a platform secured to the container side wall adjacent the entrance rim, and the platform extending from the entrance rim to the cylinder;

wherein the platform includes a plurality of platform flanges defining a flange gap therebetween, and the container side wall being received within the flange gap, a platform fastener directed through one of said flanges, with the container side wall being captured between the platform fastener and a further one of the flanges.

* * * * *